United States Patent [19]
Amakawa et al.

[11] Patent Number: 5,307,135
[45] Date of Patent: Apr. 26, 1994

[54] COLOR IMAGE FORMING APPARATUS HAVING MONO-COLOR IMAGE FORMING FUNCTION

[75] Inventors: Katsumi Amakawa, Nara; Haruo Yamamoto; Shuji Hayashi, both of Osaka, Japan

[73] Assignee: Mita Industrial Co., Ltd., Japan

[21] Appl. No.: 843,277

[22] Filed: Feb. 28, 1992

[30] Foreign Application Priority Data

Mar. 9, 1991 [JP] Japan .................................. 3-068808

[51] Int. Cl.$^5$ ............................................. G03G 15/00
[52] U.S. Cl. .................................. 355/326; 355/203; 355/209; 358/529
[58] Field of Search .............. 355/326, 327, 328, 208, 355/204–207, 209, 245; 358/78, 75, 80; 346/108

[56] References Cited

U.S. PATENT DOCUMENTS

| | | | |
|---|---|---|---|
| 4,668,978 | 5/1987 | Gokita | 358/78 |
| 4,893,179 | 1/1990 | Ito . | |
| 4,924,413 | 5/1990 | Suwannukul | 364/521 |
| 4,941,184 | 7/1990 | Sato | 358/80 X |
| 5,014,093 | 5/1991 | Ng | 355/326 |

OTHER PUBLICATIONS

Patent Abstracts of Japan, vol. 14, No. 530 (P–1134) Nov. 21, 1990, & JP-A-22 23 966 (Canon) Sep. 6, 1990.

Primary Examiner—A. T. Grimley
Assistant Examiner—T. A. Dang
Attorney, Agent, or Firm—Beveridge, DeGrandi, Weilacher & Young

[57] ABSTRACT

This invention relates to a color image forming apparatus which is capable of forming a mono-color image based on the color image input data. The apparatus includes a circuit for determining the highest value of the image input data. This circuit is called the highest value image data outputting circuit. The highest input color data value is found by comparing the values of the image data for the three primary colors (yellow, magenta and cyan) and outputting the value for the color having the highest input value. The apparatus further includes a mono-color image forming portion which forms a mono-colored image based on the output of the highest value image data outputting circuit.

10 Claims, 4 Drawing Sheets

COLOR IMAGE FORMING APPARATUS HAVING MONO-COLOR IMAGE FORMING FUNCTION

BACKGROUND OF THE INVENTION

1. Field of the Invention

The present invention relates to a color image forming apparatus, and more particularly, to a color image forming apparatus having a function of forming a mono-color image based on full-color image data.

2. Description of the Prior Art

Many color image forming apparatuses are provided with not only a function of forming a full-color image based on full-color image data which is a primary function thereof, but also a function of forming a mono-color image based on the full-color image data.

Full-color image data comprising red (R), green (G) and blue (B) signals of three primary colors of light is converted into full-color image data comprising yellow (Y), magenta (M) and cyan (C) signals of three primary colors of image &/rming material such as toner. In a color image forming apparatus, of the three primary color signals, a magenta signal is often used in forming a mono-color image based on the full color image data. This is because of the fact that it is considered that the luminosity of the human eye is sensitive to a color component of green.

As described above, in the conventional color image forming apparatus, a mono-color image is formed based on only the signal data of one color. In this case, there is hardly any problem when an original includes green images. However, for images of colors other than green, the density of the mono-color image formed is low which causes the image to be weak in color since yellow and cyan signal data are not used. In an extreme case, a defective image is formed.

SUMMARY OF THE INVENTION

An object of the present invention is to provide an image &/rming apparatus where a mono-color image of good quality is obtained in the case where a mono-color image is formed based on full-color image data.

To achieve the above-mentioned object, an image forming apparatus according to the present invention is provided with: a highest-value image data outputting means for comparing the values of the color image data of three primary colors constituting the full-color image data to output a color image data value having the highest value thereamong; and a mono-color image forming means for forming a predetermined mono-color image based on the output of the highest-value image data outputting means.

According to the above-described feature, since a color image data value is used which has the highest value among the color image data of the three primary colors inputted, the mono-color image formed has no extremely 7eak portions and no defective portions. The highest value of the color image data may be selected for every dot of the image, or it may be selected for every other dot or every few dots of the image. As a result, a mono-color image of good quality is always obtained regardless of the color specified by the input color image data of the three primary colors.

BRIEF DESCRIPTION OF THE DRAWINGS

This and other objects and features of this invention will become clear from the following description taken in conjunction with the preferred embodiments with reference to the accompanied drawings in which.

DESCRIPTION OF THE PREFERRED EMBODIMENT

Figure 1:
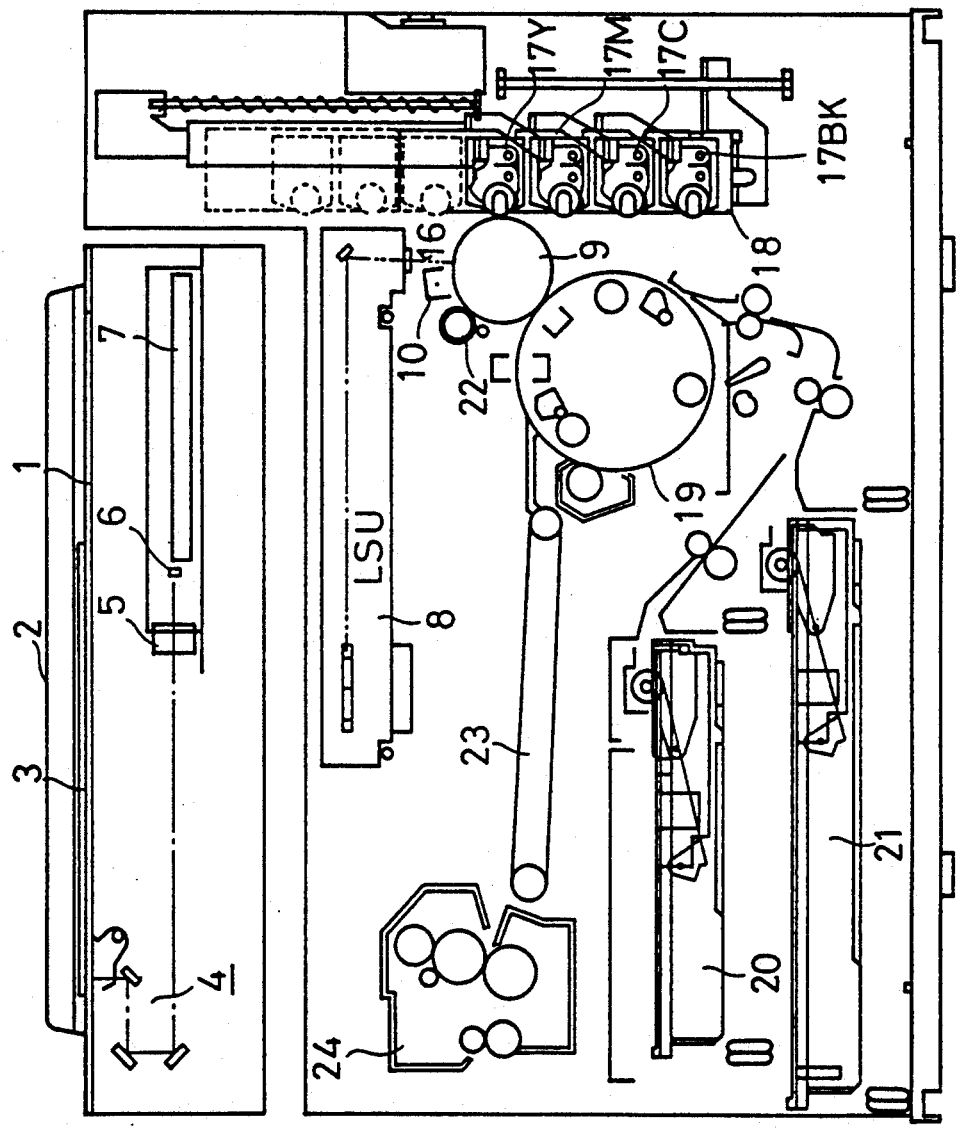
FIG. 1 is a schematic view showing the general arrangement of a digital-type color electrophotographic copying machine embodying the present invention.

The present invention will hereinafter be described with respect to a digital color electrophotographic copying machine shown in FIG. 1. In FIG. 1, an image of an original 3 placed on a contact glass 1 so as to be pressed down by an original cover 2 is scanned by an optical scanning system 4. Image information contained in the light from the scanning system 4 is directed through a condenser lens 5 to a light receiving device 6 such as a charge coupled device (CCD). After the received light is converted into an electric signal therein, it is signal-processed by an image processing circuit 7. Thereafter, it is formed into a latent image on a photoreceptor drum by a laser scanner unit 8. Prior to this, the surface of the photoreceptor drum 9 is charged by a main charger 10.

Figure 2:
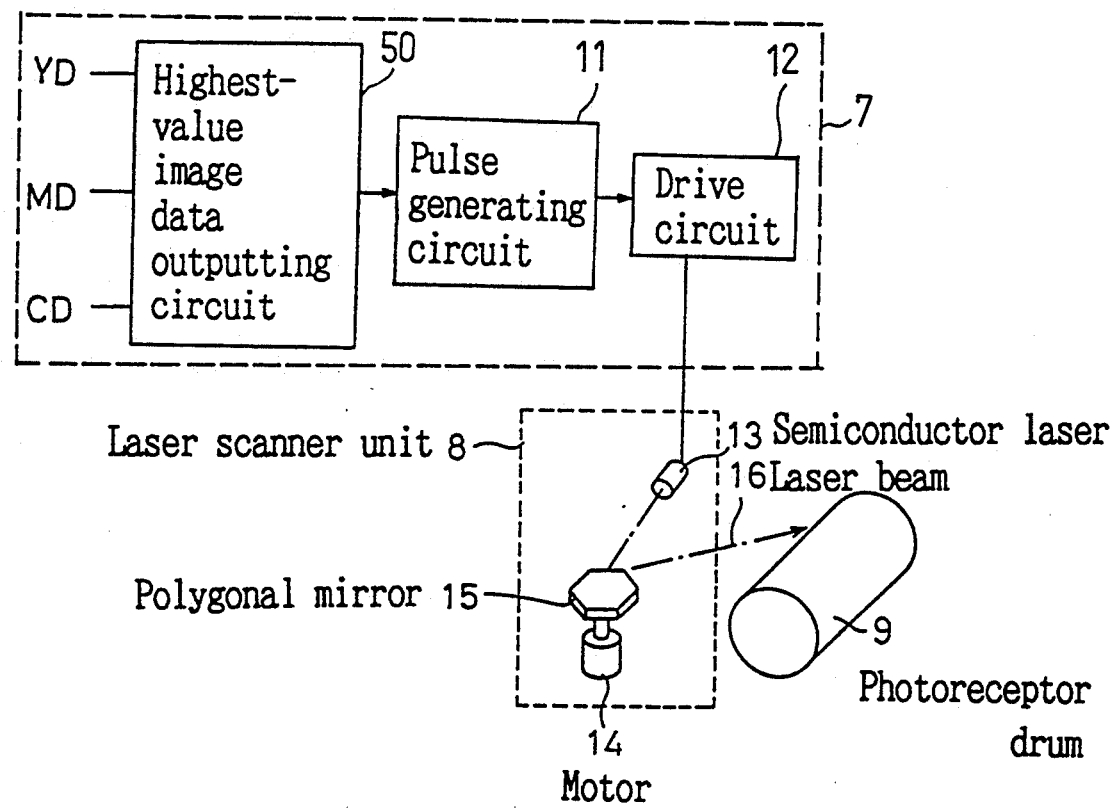
FIG. 2 is a schematic diagram showing a main portion of a color image data processing circuit and an image forming portion of the electrophotographic copying machine of FIG. 1.

FIG. 2 shows main portions of the image processing portion 7 and laser scanner unit 8 and the relation therebetween. A pulse having a width which is in accordance with the value of the image data is generated by a pulse generating circuit 11 based on the color image data outputted by a subsequently-described highest-value image data outputting circuit 50. By this pulse, a semiconductor laser 13 of the laser scanner unit 8 is activated through a drive circuit 12 to irradiate a laser beam 16. The laser beam 16 scans the surface of the photoreceptor drum 9 through a polygonal mirror 15 rotated by a motor 14 to form a latent image on the surface of the photoreceptor drum 9.

In the case where a full-color image is formed, first, a latent image is formed on the surface of the photoreceptor drum 9 by the laser beam 16 based on the yellow color image data, and the latent image is developed by a Y developer unit 17Y. The developer unit 17Y contains yellow toner, and develops the latent image on the photoreceptor drum 9 with the yellow toner. Then, the image on the photoreceptor drum 9 developed with the yellow toner is transferred onto a sheet of paper arranged to wind around the surface of a transferring drum 19. The sheet is supplied from a paper feed cassette 20 or 21 via a paper feed path.

The sheet is left attached to the surface of the transferring drum 19 after the yellow image is transferred thereon so that an image of a next color is transferred thereon.

After a cleaning of residual toner by a cleaning portion 22 and a discharging by a discharger (not shown), the photoreceptor drum 9 is again charged by the main charger 10. Then, a latent image corresponding to a magenta image on the photoreceptor drum 9 formed by the laser beam 16 based on magenta color image data is developed by an M developer unit 17M. At this time, the M developer unit 17M is brought to a development position opposite to the photoreceptor drum 9 in place of the Y developer unit 17Y.

In this embodiment, as developer units, the Y developer unit 17Y for development of yellow images, the M developer unit 17M for development of magenta images, a C developer unit 17C for development of cyan images and a BK developer unit 17BK for development of black images are successively attached as shown in FIG. 1 in a vertical direction on a moving body 18 which moves in a vertical direction. The developer units 17Y, 17M, 17C and 17BK are alternatively brought to a development position (the position opposite to the photoreceptor drum 9) according to the color image data for forming a latent image by a laser beam 16.

The image on the photoreceptor drum 9 developed with magenta toner is transferred onto the sheet (the sheet where the yellow image has been transferred) on the surface of the transferring drum 19. Similar operations are repeated to transfer cyan and black images onto the sheet to form a full-color image. Thereafter, the sheet where the full-color image has formed is separated from the transferring drum 19 and fixed by a fusing portion 24 to be discharged from the electrophotographic copying machine.

Figure 4:
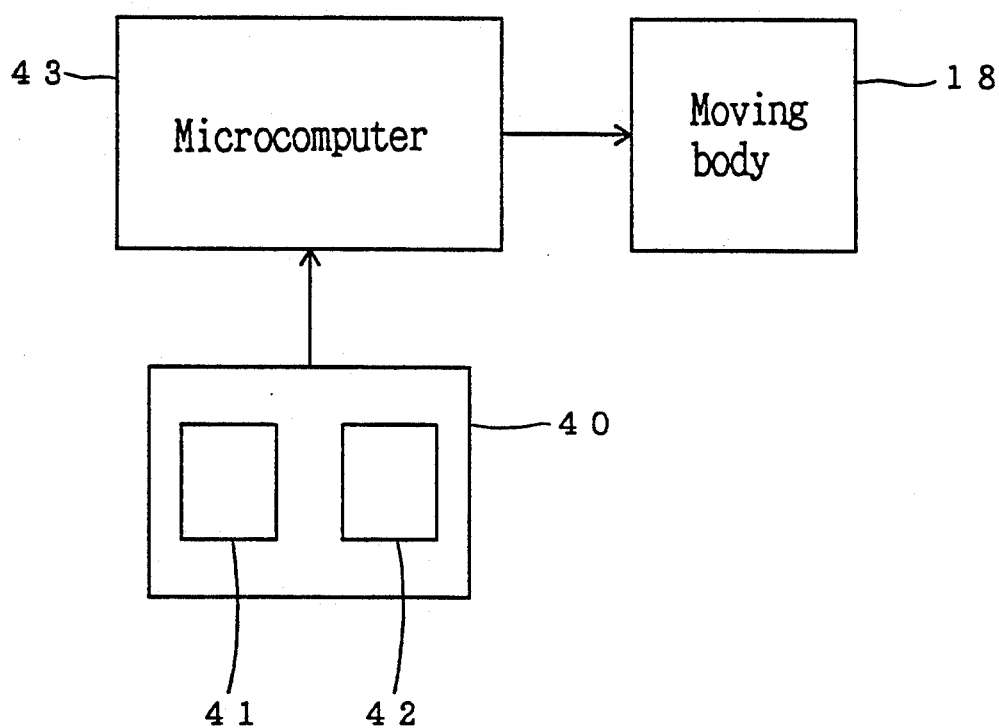
FIG. 4 is a block diagram showing a part of the portion which forms a mono-color image in the electrophotographic copying machine of FIG. 1.

Subsequently, a feature and arrangement of this embodiment &/r forming a mono-color image in this electrophotographic copying machine will be described. First, in forming a mono-color image, a mono-color image forming mode is set by operating a mode selecting button 41 of an operation board 40 shown in FIG. 4 and one of red, green, blue, yellow, magenta, cyan and black is specified by operating a color specifying button 42 thereof. In response thereto, the moving body 18 is controlled by a microcomputer 43 and a developer unit for the specified color is brought to the development position opposite to the photoreceptor drum 9. The developer unit remains at that position until the mono-color image forming mode is released.

In the mono-color image forming mode, an image of an original is also read-in with respect to the three primary colors of red, green and blue. Similarly to the case of the full-color image forming mode, the full-color image data is converted by the image processing circuit 7 into color image data of yellow, magenta and cyan which are three primary colors of toner. However, the operation in the mono-color image forming mode is different from that in the full-color image forming mode in that only the color image data having a highest value among the data values for the three primary colors is selected for every dot of the image to control the latent image forming laser beam 16 based on the highest-value color image data.

A latent image on the photoreceptor drum 9 is formed based on the highest-value color image data selected for every dot of the image is developed by a developer unit for the previously specified color. Thereafter, it is transferred onto a sheet of paper on the transferring drum 19. The sheet where an image has been transferred is conveyed to a fusing portion 24 via a conveying portion 23. After the image is fixed, the sheet is discharged.

Figure 3:
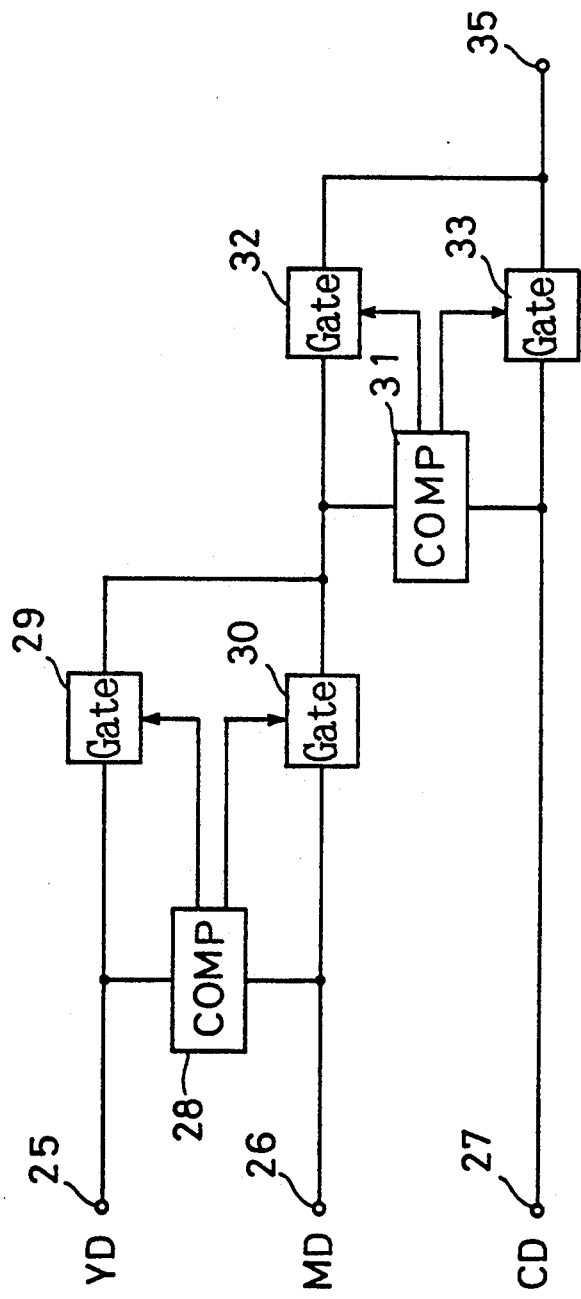
FIG. 3 is a block diagram showing a highest-value image data outputting circuit in the color image data processing circuit.

FIG. 3 is a block diagram of a highest-value image data /utputting circuit 50 for selecting and outputting a highest-value color image data value in the image formation processing circuit 7. In the figure, color image data of yellow, magenta and cyan YD, MD and CD are inputted into input terminals 25, 26 and 27, respectively. This color image data is of 8 bit form, although the data is not limited to this 8 bit form.

A first comparator 28 compares the values of the yellow color image data YD and the magenta color image data MD, and enables one of gates 29 and 30 based on a result of the comparison. Output lines of the gates 29 and 30 are connected to each other, and the higher-value color image data having passed through one of the gates is obtained. The value of the color image data selected is compared with that of the cyan color image data CD from the input terminal 27 by a second comparator 31. Gates 32 and 33 are controlled based on a result of the comparison of the second comparator 31, and the higher-value color image data is directed to an output terminal 35. Consequently, the color image data outputted from the output terminal 35 is the highest-value color image data among the color image data of the three colors constituting one dot of the image. A highest-value color image data is thus selected for every dot of the image and is provided to the pulse generating circuit 11 shown in FIG. 2. As a result, the laser scanner unit 8 is driven by a pulse which is in accordance with the highest-value color image data, and forms a latent image thereof on the surface of the photoreceptor drum 9.

Although a highest-value color image data is selected for every dot of the image in the above-described embodiment, it is not limited thereto. It may be selected for every two dots of the image or for every few dots of image. In these cases, averages of the the data values of the two or the few dots are compared in the &irst and second comparators 30 and 31.

According to the present invention, as described above, since color image data is used which has a highest value among the input color image data of the three primary colors, a mono-color image formed has no extremely weak portions and no defective portions. As a result, a mono-color image of good quality is always obtained regardless of the color specified by the input color image data of the three primary colors, which is very advantageous.

Obviously, many modifications and variations of the present invention are possible in light of the above teachings. It is therefore to be understood that within the scope of the appended claims, the invention may be practiced other than as specifically described.

What is claimed is:

1. A color image forming apparatus for forming a mono-color image based on full-color image data which includes color image data representative of three primary colors, said apparatus comprising:

highest-value image data outputting means for comparing, with one another, values of color image data representative of said three primary colors and providing a color image data value which is a highest value among said values of said color image data of said three primary colors as an output value, said three primary colors being yellow, magenta and cyan, said highest-value image data outputting means comprising a first comparator for comparing values of color image data for two of said three primary colors to determine a higher value, and a second comparator for comparing a higher value determined by said first comparator and a value of color image data of the primary color other than said two primary colors; and mono-color image forming means for forming a mono-color image based on the color image data value provided by said highest-value image data outputting means.

2. A color image forming apparatus according to claim 1, wherein said highest-value image data outputting means performs a comparison for every dot of an image and outputs said highest-value color image data among said three primary colors for every dot of said image.

3. A color image forming apparatus according to claim 1, wherein said highest-value image data outputting means further comprises:

first gate means for outputting one of the color image data values of said two primary colors based on an output of said first comparator; and second gate means for outputting one of the color image data value output by said first gate means and the color image data value of the primary color other than said two primary colors based on an output of said second comparator.

4. A color image forming apparatus according to claim 1, wherein said mono-color image forming means comprises:

a color specifying operation member for specifying a mono color to be used for forming a mono-color image;

a plurality of developer units having toner of different colors, respectively; and controlling means for activating a developer unit having toner of the color specified by said color specifying operation member.

5. A color image forming apparatus for forming a mono-color image based on a full-color image data, comprising:

image reading-in means for reading-in an original image represented by electric signals corresponding to red, green and blue which are three primary colors of light;

highest-value image data outputting means for comparing, with one another, values of color image data of the three primary colors read-in by said image reading-in means and outputting only a color image data value which is a highest value among the three primary colors and producing an output indicative of the highest value; and mono-color image forming means for forming a mono-color image based on the output of said highest-value image data outputting means.

6. A color image forming apparatus according to claim 5, wherein said highest-value image data outputting means performs a comparison for every dot of the original image and outputs a highest-value color image data value for every dot of the image.

7. A color image forming apparatus according to claim 5, wherein said highest-value image data outputting means comprises:

a first comparator for comparing values of color image data for two of the three primary colors to determine a higher value; and a second comparator for comparing a higher value determined by said first comparator and a value of color image data of the primary color other than said two primary colors.

8. A color image forming apparatus according to claim 7, wherein said highest-value image data outputting means further comprises:

first gate means for outputting one of the color image data values of said two primary colors based on an output of said first comparator; and second gate means for outputting one of the color image data value output by said first gate means and the color image data value of the primary color other than said two primary colors based on an output of said second comparator.

9. A color image forming apparatus according to claim 5, wherein said mono-color image forming means comprises:

a color specifying operation member for specifying a mono color to be formed;

a plurality of developer units having toner of different colors, respectively; and controlling means for activating a developer unit having toner of the color specified by said color specifying operation member.

10. A color image forming apparatus according to claim 5, further comprising a means for converting the electrical signals corresponding to the three primary colors of light into color image data values corresponding to yellow, magenta and cyan which are three primary colors of toner.

* * * * *